Aug. 27, 1935.　　　　J. D. TEAR　　　　2,012,837
TIME INTERVAL MEASURING ARRANGEMENT
Filed Sept. 14, 1932
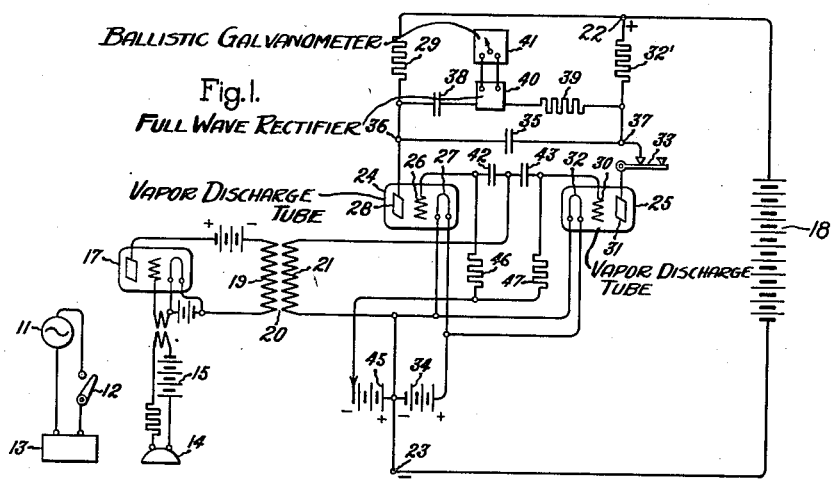
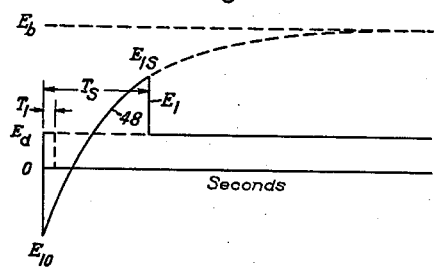
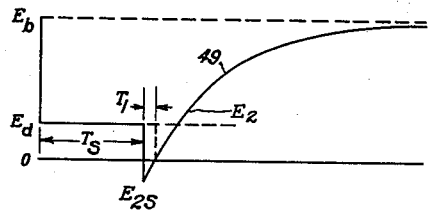
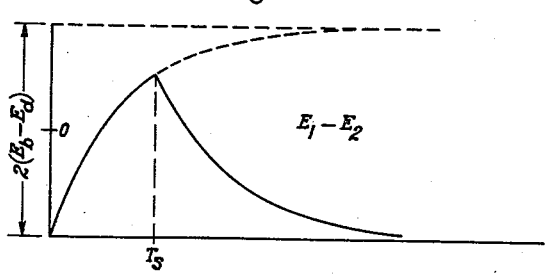
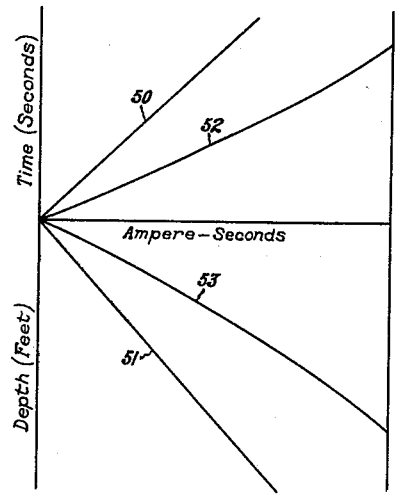
Inventor:
James D. Tear,
by Charles V. Tullar
His Attorney.

Patented Aug. 27, 1935

2,012,837

UNITED STATES PATENT OFFICE 2,012,837

TIME INTERVAL MEASURING ARRANGEMENT

James D. Tear, Schenectady, N. Y., assignor to General Electric Company, a corporation of New York Application September 14, 1932, Serial No. 633,142

10 Claims. (Cl. 177—386)

My invention relates to time-responsive devices and concerns particularly arrangements for measuring time intervals of relatively short duration.

Devices for providing indications of ocean depths are known which operate on the principle that the depth of the ocean at a particular point can be determined by measuring the length of time required for a sound impulse to be transmitted from a ship through the water and reflected back to the ship from the ocean bottom. Such devices would be particularly useful for fishing vessels and other vessels not following regular charted courses in order to provide continuous soundings to guard against running aground in shallow water and to provide an indication of the position of the ship from the known contour of the ocean bottom. In the case of fishing vessels, however, which ordinarily operate in relatively shallow water, such apparatus would be required to measure accurately very small intervals of time since the sound echo returns to the ship very quickly in shallow water. The use of the sonic method of depth finding by small fishing vessels consequently necessitates having apparatus adapted to the measurement of smaller time intervals, as well as apparatus which is less cumbersome and expensive than that heretofore available.

It is an object of my invention to provide a simple and conveniently operated apparatus which may be produced at small cost for measuring very small time intervals. Another object of my invention is to provide a simple reliable compact direct-indicating relatively inexpensive arrangement for indicating ocean depths. It is particularly an object of my invention to provide such a device which is adapted for making measurements at points where the ocean is relatively shallow. Other and further objects and advantages will become apparent as the description proceeds.

In accordance with my invention in its preferred form, I provide means for transmitting sound impulses through water, and means for converting the sound impulses received from the water into positive electrical impulses together with apparatus for measuring the time interval between successive impulses. The apparatus for measuring time intervals preferably comprises a pair of grid controlled discharge tubes connected in parallel to a source of direct current in a circuit so arranged that only one of the discharge tubes is normally conducting. The positive impulses produced by the sound receiving apparatus at the beginning and the end of each time interval are applied to the control grids of the discharge tubes and cause the discharge to be transferred from one tube to the other at the beginning of the interval and back to the originally conducting tube again at the end of the interval.

Resistance may be inserted in the anode leads, and a condenser may be connected between the anodes of the two tubes to cause variations in the potential difference between the anodes caused by the shift in current to take place more gradually. Obviously, the maximum variation in potential difference as well as the summation of current flowing in the second tube or in a bridging circuit depends upon the length of time the second tube remains conducting. Accordingly, suitable means responsive to variations in potential difference or to integrated current are provided to indicate the length of the time interval. The features of my invention which I believe to be novel and patentable will be pointed out in the claims appended hereto.

For a better understanding of my invention reference may be had to the following description taken in connection with the accompanying drawing, in which Fig. 1 represents one form of time interval measuring apparatus constructed in accordance with my invention and used to form a part of an electrical sounding apparatus; Figs. 2 and 3 are curves representing the anode potentials of the two discharge tubes respectively; Fig. 4 is a combination of Figs. 2 and 3 showing the variations in the potential difference between the anodes of the two discharge tubes; and Fig. 5 is an illustrative calibration curve for a sonic depth finder constructed in accordance with my invention.

Referring now more in detail to the drawing in which like reference characters refer to like parts throughout, I have illustrated my invention by showing one form of time measuring circuit in combination with means for producing and receiving sound impulses for making measurements of ocean depths. Any desired means for producing a sound impulse in the water may be utilized, such as for example, a device 11 for producing electrical impulses controlled by a switch 12 and energizing suitable means 13 for converting electrical impulses into mechanical impulses. It will be understood, however, that sound impulses may also be produced in any other desired manner, as for example by striking against the side of the vessel below the water line with a suitable implement.

Suitable means are employed for reconverting the sound impulses into electrical impulses. Such means may take the form for example of a receiver 14 in series with a battery 15 in a circuit inductively connected to the grid circuit of a three-element discharge tube 17. The discharge tube 17 has connected in its plate circuit the primary winding 19 of a transformer 20, the secondary winding 21 of which serves to supply to the electric timing means the positive electrical impulses which define the time interval.

The electrical timing means comprises a source of direct current 18 having a positive terminal 22 and a negative terminal 23 supplying in parallel a pair of discharge tubes 24 and 25 which may, if desired, be of the vapor discharge type. The discharge tube 24 comprises control grid 26, cathode 27 connected to the negative side 23 of the source of current, and anode 28 connected in series with a resistor 29 to the positive side 22 of the current source. In a similar manner the discharge tube 25 comprises control grid 30, cathode 32, and anode 31. In this case also a resistor 32' is connected between the anode 31 and the positive side 22 of the current source 18. However, the anode circuit of the discharge tube 25 also includes a normally closed switch 33 by means of which the anode circuit may be opened to interrupt a discharge through the tube 25. The purpose of this operation will be explained hereinafter in connection with the operation of the apparatus in general. Although any suitable type of discharge tubes may be employed, preferably in apparatus where the maximum compactness and reliability are desired, these take the form of hot cathode tubes and a battery 34 is utilized to supply the heating current.

A condenser 35 is connected between the points 36 and 37 so as to be subjected to the difference in potential between the anodes 28 and 31.

Although an electrical indication of the length of the time interval may be obtained either from a device integrating directly the flow of current through discharge tube 25 or from a device responsive to the variation in potential difference between the anodes 28 and 31, which obviously depends upon the magnitude and duration of the current flowing in tube 25, I prefer to utilize a device of the latter type. Any suitable type of apparatus might be connected to or in parallel with condenser 35 to measure the maximum variation in potential difference, and thereby obtain an indication of the duration of the time interval. I have found, however, that a device with a desirable scale may be produced by connecting a condenser 38, a resistor 39, and a full wave rectifier 40 in series between the terminals 36 and 37 to which condenser 35 is connected and connecting a ballistic galvanometer 41 to the rectifier 40 so as to respond to current through resistor 39.

Preferably the positive electrical impulses defining the time interval are impressed upon the control grids 26 and 30 of the discharge tubes 24 and 25 through condensers 42 and 43. A suitable negative bias is impressed on the control grids 26 and 30 by means of the grid battery 45 connected to the grids 26 and 30 through resistors 46 and 47 respectively.

The arrangement of the tubes 24 and 25 is such that the operation thereof may be controlled either by the grid potential or by the plate potential. A discharge is initiated by changing the grid potentials in response to an impulse and is interrupted by reducing the plate potential. By reason of the drop in potential in the resistance 29 and 32' and the direction and magnitude of the charge on the condenser 35 associated with the plate connections of the tubes the initiation of a discharge current in one tube circuit causes the plate potential of the other tube to be lowered below that necessary for it to be conducting. As a result only one tube discharges at a time and the discharge is alternately shifted from one tube to the other in response to alternate impulses.

When a sound impulse is produced by means of the device 13, one portion of the sound wave is transmitted directly to the receiver 14 and another portion of the impulse travels to the bottom of the ocean, is reflected and travels back to the receiver 14 in the form of an echo. Since the velocity of propagation of sound in water is substantially constant, the time interval between the reception of the directly received sound impulse and the reflected impulse by receiver 14 is an indication of the distance from the receiver 14 to the bottom of the ocean. When the sound impulse is received by the receiver 14, an electrical impulse is produced which is amplified by the discharge tube 17 and supplied as an induced voltage impulse to the time measuring apparatus by means of the winding 21 of the transformer 20. The apparatus is so connected that the side of the winding 21 connected to the condensers 42 and 43 becomes positive.

The magnitude of the negative grid bias of the discharge tubes 24 and 25 and the potential of the current source 18 supplied by the terminals 22 and 23 are so chosen that normally the discharge tubes remain non-conducting until a discharge is initiated by supplying a positive impulse to the grid. After either of the tubes has become conducting it continues to conduct even after the positive grid bias is removed until the anode potential falls to a certain minimum value. The characteristics of the circuit are such that normally only one of the tubes conducts current at a time. With high values of negative grid bias, both tubes cannot conduct simultaneously as inevitable differences in tubes or parts of the circuits would cause slightly unequal currents to be drawn or unequal anode voltages to be obtained, thereby depressing one of the anode potentials below that required for conductivity of the tube with the high negative grid basis. However, with lower values of negative grid bias, when the potential is first applied between the terminals 22 and 23, if the potential is applied suddenly both of the tubes may become conducting. In this case, the switch 33 is opened manually to interrupt the discharge in tube 25, and the discharge then continues only in discharge tube 24.

The positive impulse applied to the control grids 26 and 30 as a result of the sound impulse reaching receiver 14 causes tube 25 to become conducting. However, when the tube 25 becomes conducting the potential of the point 37 is lowered considerably as a result of the current flowing through the resistor 32'. While tube 24 was conducting and tube 25 was non-conducting, point 37 was at the potential of point 22 and point 36 was at a lower potential owing to the voltage drop in resistor 29. In consequence, a charge had been built up on condenser 35, the plate connected to point 36 being negative with respect to the plate connected to point 37. Inasmuch as this charge cannot leak off instantaneously, point 36 continues to be negative with respect to point 37 when tube 25 becomes conducting and the potential of point 37 is lowered by the voltage drop in resistor 32'. The potential at point 36 must, therefore, fall momentarily the same amount as the potential at point 37 and owing to the constants chosen for the apparatus the potential of point 36 falls below the minimum required to permit the tube 24 to remain conducting. Accordingly, the effect of applying a positive impulse to the control grids is to transfer the current from one tube to the other. In a similar manner, the positive impulse produced by the reception of the reflected sound impulse in receiver 14 will transfer the current back from discharge tube 25 to discharge tube 24.

The operation of the tubes is illustrated by the curves of Figs. 2 and 3 in which the heavy irregular curve $E_1$ represents the anode potential of tube 24 and the heavy irregular curve $E_2$, the anode potential of tube 25. The potential difference of the current source between terminals 22 and 23 is represented by $E_b$, measured from the zero line, in Figs. 2 and 3, and the minimum anode potential with which the discharge tubes will continue to conduct with negative grid biases is represented by the symbol $E_d$. Obviously, the current flowing through the discharge tube is fixed within the capacity of the tube by that current which causes sufficient potential drop in the resistors 29 and 32' to cause the anode potential just to equal $E_d$, the minimum with which the tubes will remain conducting.

Referring now to Fig. 2, at the time zero when the first impulse is received and tube 25 becomes conducting, the anode potential $E_2$ of tube 25 falls from $E_b$ to $E_d$ carrying the anode potential $E_1$ of the discharge tube 24 a corresponding amount below its previous potential which was $E_d$. Accordingly the anode potential of tube 24 falls to $E_{10}$ and then rises exponentially toward line potential $E_b$, along curve 48 as the charge of condenser 35 gradually responds to the changed circuit conditions. The tube 24 then remains non-conducting provided that the potential $E_d$ is regained some time later than the time $T_1$ which is the deionization time of the tube. When the second positive impulse corresponding to the reflected sound impulse is received, at the time $T_s$, tube 24 becomes conducting again and the anode potential of discharge tube 24 falls from $E_{1s}$ to $E_d$ and remains at this value.

Referring to Fig. 3, it will be seen that the anode potential $E_2$ of discharge tube 25, having fallen from value $E_b$ to value $E_d$ at the time zero, remains at $E_d$ until the second positive impulse is received at the time $T_s$. At the time $T_s$ when the tube 24 again becomes conducting, the anode potential $E_2$ falls an amount equal to the difference between the two anode potentials $E_{1s}$ minus $E_b$, to the value $E_{2s}$ after which it again rises exponentially toward line potential $E_b$ along curve 49, and tube 25 then remains non-conducting provided the potential $E_d$ is regained some time later than $T_s$ plus the deionization time $T_1$. The rates at which $E_1$ and $E_2$ rise after a shift in current obviously depend upon the electrical constants of the circuit.

The curve shown in Fig. 4 is obtained by subtracting the values indicated by the curve in Fig. 3 from those of the curve in Fig. 2 and accordingly represents the difference $E_1-E_2$ between the anode potentials of discharge tubes 24 and 25. Since the initial value at the time zero is the value which corresponds to normal conditions, the values measured from the lower line, shown as a solid line, may be taken as the change from normal of the value $E_1-E_2$. Since the condenser 35 is connected between anodes 28 and 31, the curve in Fig. 4 also represents the change from the normal potential difference across the condenser 35 and gives values proportional to the change in charge carried by condenser 35. Since the condenser 38 is connected through a resistor 39 to the condenser 35, the charge on condenser 38 will tend to follow the variations in potential across condenser 35 shown in Fig. 4. There will however be some time lag dependent upon the magnitude of the resistor 39. Obviously the variation in charge on condenser 38 will be effected by a flow of current through resistor 39 and rectifier 40, in one direction as the charge decreases, and in the other direction as the charge increases. Since the condenser 38 prevents the continuous flow of direct current, the summation of current flowing through the rectifier 40 in a given direction will be equal to that flowing in the opposite direction, and the deflection of the ballistic galvanometer will be proportional to the summation of current in either direction, or the variation in charge. From the curve shown in Fig. 4 it will be seen that the maximum value of the quantity $E_1-E_2$ depends upon the time $T_s$ at which the second positive impulse is received. Consequently, the variations in charge on the condensers 35 and 38 will also depend upon the length of the time interval.

I have discovered that by choosing suitable values of resistance and capacity for the elements of the circuit, the total quantity of current flowing through the resistor 39, and consequently the deflection of the ballistic galvanometer can, if desired, be made directly proportional to the length of the time interval. This linear relationship is found to hold if the value of the product RC is made relatively small in comparison with the value of the product $rc$, where R represents the resistance of either of the resistors 29 or 32', C represents the capacity of the condenser 35, $r$ represents the resistance of the resistor 39, and $c$ represents the capacity of the condenser 38. The calibration curves shown in Fig. 5 represent the relationship between the time in seconds or the depth in feet measured by my apparatus and the quantity of electricity measured by the ballistic galvanometer 41 for two different sets of values of R, C, $r$ and $c$.

In an apparatus in which the ratio of RC to $rc$ was made approximately 1 to 350, calibration curves 50 and 51 were obtained which it will be observed are linear. In a similar apparatus in which the value of $r$ was reduced approximately tenfold, calibration curves 52 and 53 were obtained which, however, are drawn to a larger scale along the vertical axis. It will be observed that the curves 52 and 53 tend to increase gradually in slope. I have found that if the values of the products $rc$ and RC are of approximately the same order of magnitude, the calibration curves will become exponential; that is, the total quantity of electricity flowing through the resistor 39 will increase exponentially with the length of the time interval or the depth of the ocean. Such an arrangement might be of advantage in connection with apparatus where it is desired to measure a large range of time intervals without change of scale. It will be understood that the instrument 41 is preferably calibrated directly in terms of the ultimate quantity which it is desired to measure, such as fractions of a second or depth in linear units, in order that the device may be direct reading.

In accordance with the provisions of the patent statutes, I have described the principle of operation of my invention, together with the apparatus which I now consider to represent the best embodiment thereof, but I desire to have it understood that the apparatus shown is only illustrative and that the invention may be carried out by other means.

What I claim as new and desire to secure by Letters Patent of the United States, is:

1. A device for measuring time intervals which comprises in combination with a source of direct current, a pair of resistors, a pair of vapor discharge tubes each having a control grid, a cathode connected to the negative side of said current source and an anode connected to the positive side of said current source through one of said resistors, a condenser connected between the anodes of said discharge tubes, serving to control the anode potential of said tubes so that only one is normally conducting at a time, a second condenser, a third resistor and a rectifier in series connected in parallel with said first mentioned condenser, the values of resistance and capacity being such that the product of the resistance of either of said first mentioned resistors and the capacity of said first mentioned condenser is relatively small compared with the product of the resistance of said third resistor and the capacity of said second condenser, a galvanometer supplied by said rectifier, a pair of condensers in series connected between the control grids of said discharge tubes, and means for applying to a point between said latter condensers a positive electrical impulse at the beginning of a time interval to be measured and another positive impulse at the end of the interval, thereby momentarily raising the potential of said control grids, causing a shift of current from the circuit of one of said discharge tubes to the circuit of the other of said tubes during said interval, producing potential variations between said anodes, a flow of current in said third-mentioned resistor, and consequently producing a response in said galvanometer dependent upon the length of said time interval.

2. A device for measuring time intervals which comprises in combination with a source of direct current a pair of resistors, a pair of discharge tubes each having a control grid, a cathode connected to the negative side of said current source and an anode connected to the positive side of said current source through one of said resistors, a condenser connected between the anodes of said discharge tubes, serving to control the anode potential of said tubes so that only one is normally conducting at a time, a second condenser, a third resistor and a rectifier in series connected in parallel with said first-mentioned condenser, a galvanometer supplied by said rectifier, and means for applying to the control grids of said discharge tubes a positive electrical impulse at the beginning of a time interval to be measured and another positive impulse at the end of the time interval, thereby causing a shift of current from the circuit of one discharge tube to that of the other during said interval, producing potential variations between the anodes of said discharge tubes, a flow of current in said third-mentioned resistor and consequently producing a response in said galvanometer dependent upon the length of said time interval.

3. A device for measuring time intervals which comprises in combination with a source of direct current, a pair of resistors, a pair of discharge tubes each having a control grid, a cathode connected to the negative side of said source and an anode connected to the positive side of said source through one of said resistors, a condenser connected between the anodes of said discharge tubes, serving to control the anode potential of said tubes so that only one is normally conducting at one time, a second condenser, and a third resistor in series connected in parallel with said first mentioned condenser, means responsive to the total quantity of electricity flowing through said third mentioned resistor, and means for applying to the control grids of said discharge tubes a positive electrical impulse at the beginning of the time interval to be measured and another positive impulse at the end of the interval, thereby causing a shift in current from the circuit of one of said discharge tubes to that of the other during said interval, producing potential variations between said anodes, a flow of current in said third-mentioned resistor and consequently producing a response in said electricity-responsive means dependent upon the length of said time interval.

4. A device for measuring time intervals which comprises in combination with a source of direct current, a pair of resistors, a pair of discharge tubes each having a control grid, a cathode connected to the negative side of said current source and an anode connected to the positive side of said current source through one of said resistors, a condenser connected between the anodes of said discharge tubes serving to control the anode potential of said tubes so that only one is normally conducting at a time, a second condenser, and a third resistor in series connected in parallel with said first-mentioned condenser, the values of resistance and capacity being such that the product of the resistance of either of said first-mentioned resistors and the capacity of said first-mentioned condenser is relatively small compared with the product of the resistance of said third resistor and the capacity of said second condenser, means responsive to the integrated flow of current through said third-mentioned resistor, and means for applying to the control grids of said discharge tubes a positive electrical impulse at the beginning of the time interval to be measured and another positive impulse at the end of the interval, thereby causing a shift of current from the circuit of one of said discharge tubes to that of the other during said interval, producing potential variations between the anodes, a flow of current in said third-mentioned resistor and consequently producing a response in said current-responsive means dependent upon the length of said time interval.

5. A device for measuring time intervals which comprises in combination with a source of direct current, a pair of resistors, a pair of discharge tubes each having a control grid, a cathode connected to the negative side of said current source and an anode connected to the positive side of said current source through one of said resistors, a condenser connected between the anodes of said discharge tubes serving to control the anode potential of said tubes so that only one is normally conducting at a time, means responsive to the net change in potential difference across said condenser, and means for applying to the control grids of said discharge tubes a positive electrical impulse at the beginning of the time interval to be measured and another positive impulse at the end of the interval, thereby causing a shift of current from the circuit of one of said discharge tubes to that of the other during said interval, producing potential variations between said anodes and consequently producing a response in said potential-responsive means dependent upon the length of said time interval.

6. A device for measuring time intervals which comprises in combination with a source of direct current, a pair of vapor discharge tubes having negatively biased control grids, said tubes being connected in capacitatively coupled parallel circuits including resistances and supplied by said current source, means for initially preventing the flow of current in one of said tube circuits, means for applying to the control grids of said discharge tubes a positive electrical impulse at the beginning of the time interval to be measured and another positive impulse at the end of the interval, each impulse initiating a flow of current in the tube circuit which has been non-conducting, thereby extinguishing the discharge in the tube which has been conducting by depressing the voltage acting thereon, thus shifting current from the circuit of one of said discharge tubes to that of the other for the duration of said interval, and means dependent upon the total quantity of electricity flowing through the initially non-conducting tube during said interval, for the purpose of providing an indication of the length of said time interval.

7. A device for measuring time intervals which comprises a source of current, a pair of discharge tubes connected in parallel circuits to said current source, said tubes each including an anode and a control grid, means for transmitting potential variations from the anode of one discharge tube to the anode of the other, resistors connected in the anode leads of said discharge tubes causing the anode potential of either tube to fall when it becomes conducting, means for initially preventing more than one of said tubes from being conducting, means for applying to the control grids of said discharge tubes a positive electrical impulse at the beginning of a time interval to be measured and another positive impulse at the end of the interval, thereby causing the non-conducting tube to become conducting in response to each impulse, causing its anode potential to fall and so far to lower the anode potential of the other tube as to extinguish its discharge whereupon the potential of the latter tube gradually rises, the resistor in the anode lead of said latter tube serving to delay said rise in potential, and means responsive to the variation in difference between anode potentials and consequently to the length of the time interval.

8. Impulse responsive apparatus comprising in combination with a source of supply a pair of discharge tubes having anode, grid and cathode electrodes, said tubes having their anode and cathode electrodes connected in parallel circuits across said source of supply, means associated with the anode connections of said tubes whereby the anode potential of either tube is controlled by the discharge of the other tube to cause the tubes to be alternately conducting, means for impressing impulses upon the grids of said tubes to initiate a discharge in one or the other of said tubes and indicating means responsive to the duration of shifting of current from one of said tubes to the other.

9. Impulse responsive apparatus comprising a pair of discharge tubes having anode and cathode electrodes connected in parallel circuits to a suitable source of supply, and having control grids connected in parallel, means for impressing impulses on said grids to initiate a discharge in one or the other of said tubes, means associated with the anodes of said tubes whereby the discharge of either tube interrupts the discharge of the other tube so that said tubes alternately discharge in response to alternate impulses, and measuring means responsive to the duration of the shifting of discharge from one of said tubes to the other.

10. A sounding apparatus comprising means for receiving directly transmitted sound impulses and echo sound impulses and converting said impulses into positive electrical impulses, a pair of discharge tubes connected in parallel circuits, a source of current energizing said tube circuits, means whereby the discharge of one tube interrupts the discharge of the other and vice versa, said tubes having control grids, said sound impulse converting means being connected to said control grids in response to received sound impulses, thereby switching the discharge current from one of said discharge tubes to the other during the time interval defined by said directly transmitted and echo sound impulses, and electrical integrating means responsive to the length of time current is transferred to said second tube.

JAMES D. TEAR.